US006807436B2

(12) United States Patent
Huang et al.

(10) Patent No.: US 6,807,436 B2
(45) Date of Patent: Oct. 19, 2004

(54) ORIENTATION-ADJUSTING DEVICE FOR PROPERLY ORIENTING WIRELESS TRANSCEIVER IN CONFINED SPACE

(75) Inventors: Chien-Bin Huang, Taipei (TW); Kris Verstockt, Taipei (TW); Ko-Chein Chuang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 602 days.

(21) Appl. No.: 09/841,344

(22) Filed: Apr. 24, 2001

(65) Prior Publication Data

US 2002/0115415 A1 Aug. 22, 2002

(30) Foreign Application Priority Data

Feb. 21, 2001 (TW) ........................................ 90103979 A

(51) Int. Cl.⁷ ............................................... H04B 1/38
(52) U.S. Cl. .................................... 455/575.1; 343/702
(58) Field of Search ....................... 455/66.1, 74, 90.3, 455/575.1, 575.7; 343/702, 757, 766, 882

(56) References Cited

U.S. PATENT DOCUMENTS 6,292,146 B1 * 9/2001 Melax .......................... 343/702
6,359,591 B1 * 3/2002 Mou ............................ 343/702

* cited by examiner

Primary Examiner—Lee Nguyen
Assistant Examiner—Sanh D Phu
(74) Attorney, Agent, or Firm—Gazdzinski & Associates

(57) ABSTRACT

An orientation-adjusting device for adjusting an orientation of a wireless transceiver is disclosed. The transceiver is mounted in a PC via a USB adapter. The orientation-adjusting device includes a first housing for accommodating therein the transceiver, a second housing pivotally connected to the first housing to allow the first housing to rotate in a first direction relative thereto, and a third housing for accommodating therein the USB adapter, pivotally connected to the second housing to allow the second housing to rotate in a second direction relative thereto. By this way, the orientation of the transceiver accommodated in the first housing can be adjusted in two dimensions to perform communication functions well even when it is fitted into a confined space in the PC.

21 Claims, 2 Drawing Sheets

ORIENTATION-ADJUSTING DEVICE FOR PROPERLY ORIENTING WIRELESS TRANSCEIVER IN CONFINED SPACE

FIELD OF THE INVENTION

The present invention relates to an orientation-adjusting device, and more particular to an orientation-adjusting device for properly adjusting the orientation of a wireless transceiver so as to allow the transceiver to be fitted into a confined space.

BACKGROUND OF THE INVENTION

Universal Serial Bus (USB) has been becoming a major type of connecting ports for personal computers. As result, many newly developed peripheral equipment, e.g. Bluetooth-related peripheral equipment, are designed with USB as a standard interface. On the other hand, a wireless transceiver is more and more popular to become a part of a personal computer. Therefore, the equipment of a personal computer with a wireless transceiver interfaced therebetween with a USB adapter becomes a trend. In order to be fitted into a confined space, especially in a portable computer of small size, and perform the wireless communication function well, the wireless transceiver should be properly oriented.

SUMMARY OF THE INVENTION

Therefore, an object of the present invention is to provide an orientation-adjusting device for properly orienting a wireless transceiver in a confined space, which preferably performs two dimensional adjustment.

A first aspect of the present invention relates to an orientation-adjusting device for adjusting an orientation of a wireless communication device. The wireless communication device is mounted in a main frame via an interface device, and the orientation-adjusting device includes a first housing for accommodating therein the wireless communication device; a second housing pivotally connected to the first housing to allow the first housing to rotate in a first direction relative thereto; and a third housing for accommodating therein the interface device, pivotally connected to the second housing to allow the second housing to rotate in a second direction relative thereto.

Preferably, the second housing includes a passage for penetrating therethrough a signal cable connecting the wireless communication device and the interface device.

In an embodiment, the first housing includes a first cylindrical portion for sleeving therearound the second housing, and serving as a first shaft for rotating the first housing therewith in the first direction.

In an embodiment, the second housing includes a first engaging part, the third housing includes a second engaging part, and the first and second engaging parts pivotally connected to each other to serve as a second shaft for rotating the second housing therewith in the second direction, and form a second hollow cylindrical portion for penetrating therethrough the signal cable.

In an embodiment, the second housing includes a hollow disk body secured to the first engaging part for sleeving around the first cylindrical portion. Preferably, the second hollow cylindrical portion serves as a rotation-angle confiner of the first housing in the first direction.

Preferably, the first direction is perpendicular to the second direction so as to perform two-dimensional adjustment.

For example, the wireless communication device can be a wireless transceiver, the main frame can be a personal computer, and the interface device can be a Universal Serial Bus (USB) adapter.

A second aspect of the present invention relates to another orientation-adjusting device for adjusting an orientation of a wireless communication device. The orientation-adjusting device includes a first housing for accommodating therein the wireless communication device, which includes a first shaft; a second housing including a first portion penetrating therethrough the signal cable and sleeving around the first shaft, and a second portion being of a hollow cylindrical shape; and a third housing including a third portion for accommodating therein the interface device, and a fourth portion being of a hollow cylindrical shape, engaging with the second portion of the second housing to form a hollow cylinder for penetrating therethrough the signal cable, and serving as a second shaft, wherein the first and second housings optionally perform a first relative rotating motion with the first shaft, and the second and third housings optionally perform a second relative rotating motion with the second shaft to adjust the orientation of the wireless communication device.

In an embodiment, the first portion of the second housing being of a disk shape.

Preferably, the first and second relative rotating motions are in different directions so as to perform two-dimensional adjustment.

A third aspect of the present invention relates to an orientation-adjustable transceiver assembly, which includes a transceiver mounted in a first housing; a signal cable connected to the transceiver and penetrating through a second housing which pivots relative to the first housing to adjust the orientation of the transceiver in a first direction; and an interface device connected to the signal cable and mounted in a third housing which pivots relative to the second housing to adjust the orientation of the transceiver in a second direction different from the first direction.

In an embodiment, the first housing includes a first shaft for sleeving therearound the second housing, and allowing the second housing to pivot thereabout in the first direction.

In an embodiment, the second housing includes a first engaging part, the third housing includes a second engaging part, and the first and second engaging parts engage with each other to form a second shaft for allowing the third housing to pivot thereabout in the second direction.

Preferably, the second shaft is hollow for penetrating therethrough the signal cable.

Preferably, the interface device is a Universal Serial Bus (USB) adapter.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
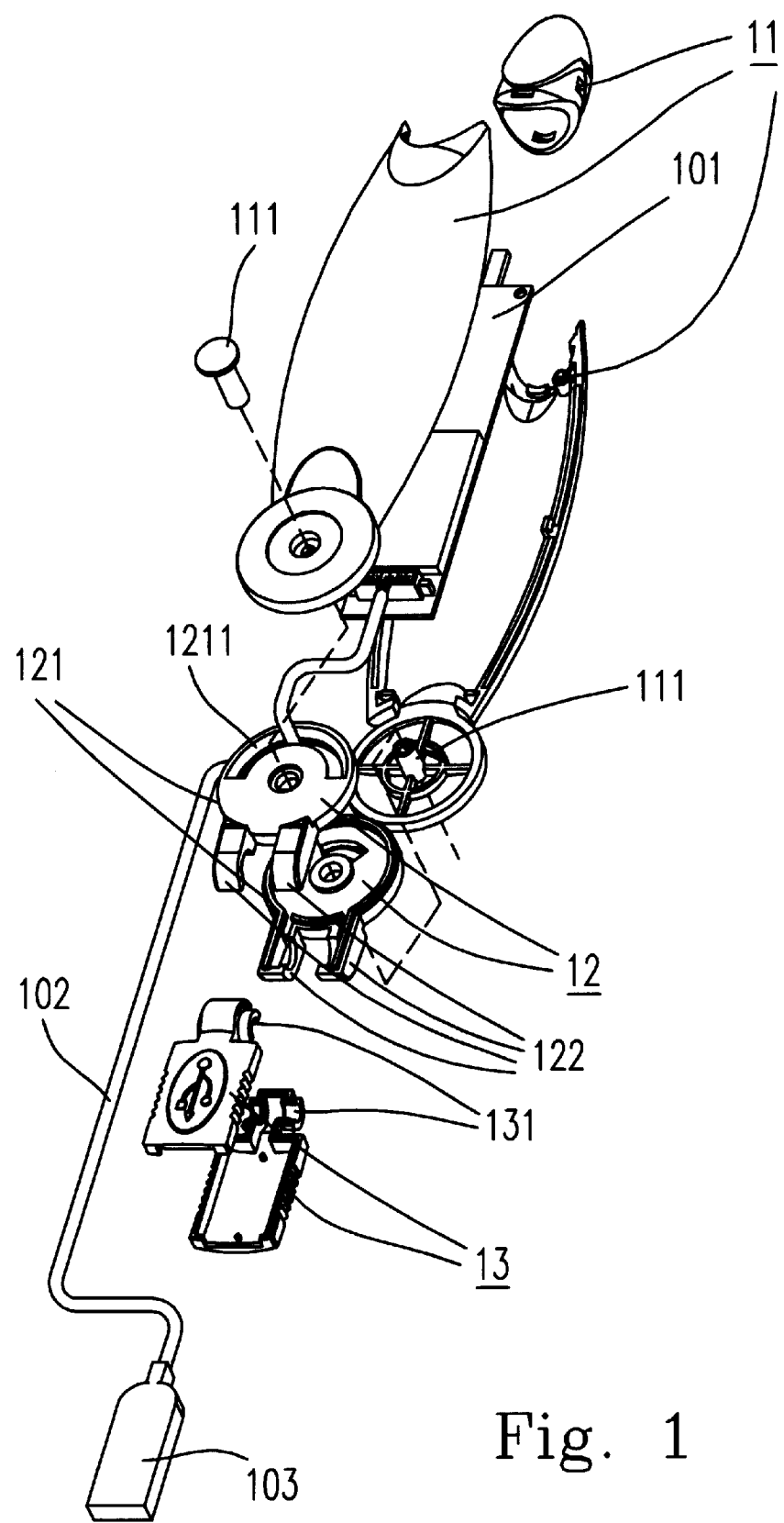
FIG. 1 is a resolving diagram schematically showing a preferred embodiment of an orientation-adjusting device for adjusting an orientation of a wireless transceiver according to the present invention.
Figure 2:
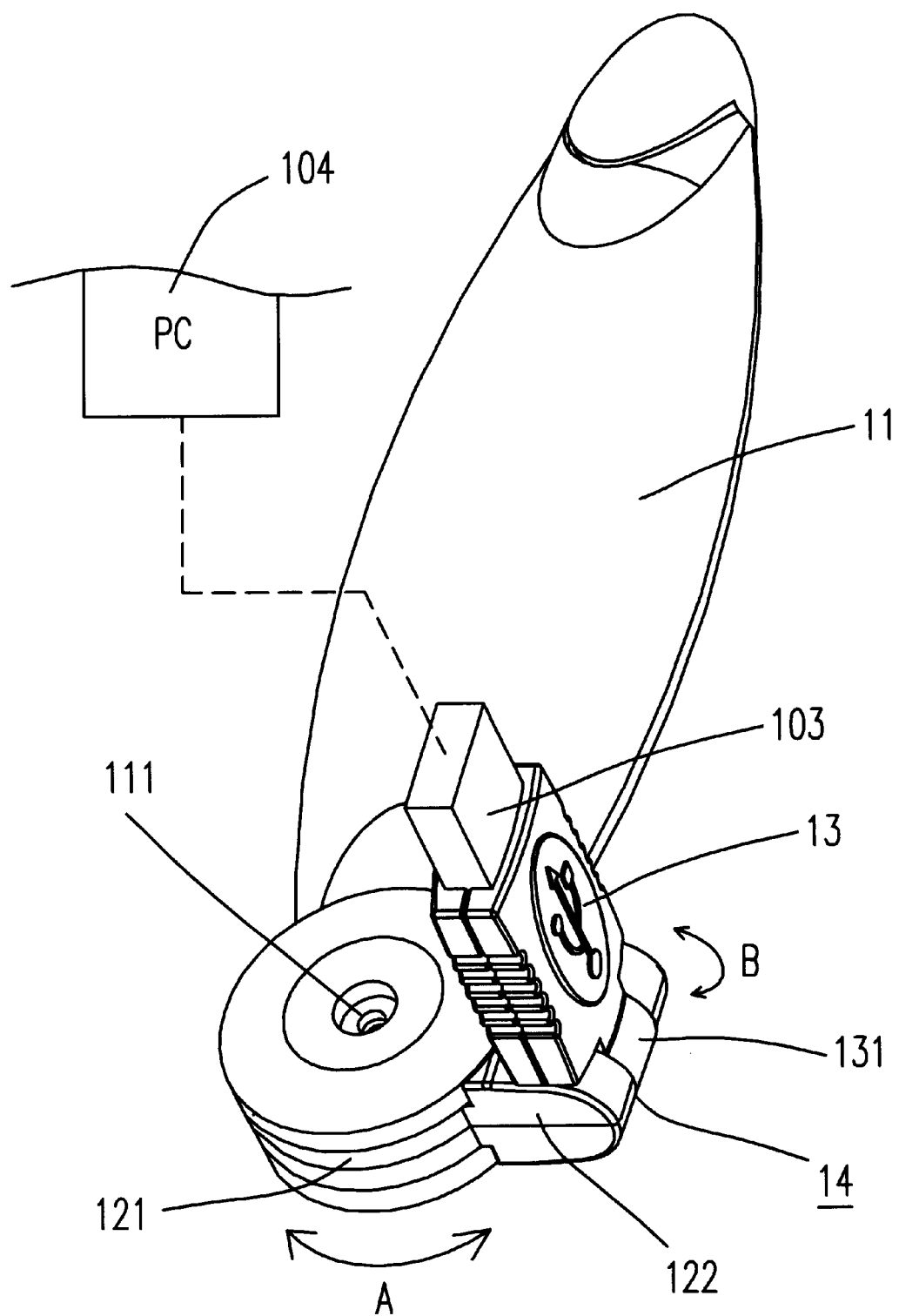
FIG. 2 is a schematic diagram showing the assembly of FIG. 1 as an orientation-adjustable transceiver assembly according to the present invention.

Please refer to FIGS. 1 & 2. The orientation-adjustable transceiver assembly includes a transceiver 101, a signal cable 102, a USB adapter 103 and an orientation-adjusting device consisting of a first housing 11, a second housing 12 and a third housing 13. The first housing 11 accommodates therein the transceiver 101, and includes a cylindrical portion 111 to sleeve therearound a disk-shaped portion 121 of the second housing 12. The second housing 12 further includes hollow cylindrical parts 122 to engage with another hollow cylindrical part 131 of the third housing 13. The cylindrical part 131 is inserted between the cylindrical parts 122 to form an integral hollow cylinder 14 (FIG. 2). The signal cable 102 connected to the transceiver 101 penetrates through a passage 1211 in the disk-shaped portion 121 of the second housing 12, and further penetrates through the integral hollow cylinder 14 to be connected to the USB adapter 103 which is accommodated in the third housing 13, thereby completing the assembly, as shown in FIG. 2.

For the transceiver assembly shown in FIG. 2, the cylindrical portion 111 serves as a first shaft which allows the first housing 11 and the second housing 12 perform a first relative rotating motion in a first direction A. On the other hand, the hollow cylinder 14 serves as a second shaft which allows the second housing 12 and the third housing 13 to perform a second relative rotating motion in a second direction B. In other words, when the USB connector 103 accommodated in the third housing is connected with a main frame, e.g. a personal computer 104, to be positioned in a fixed position, the orientation of the transceiver 101 can be adjusted in the second direction B by pivoting the second housing 12 about the shaft 14, and further adjusted in the first direction A by pivoting the first housing about the shaft 111.

By this way, the orientation of the transceiver can be adjusted in two dimensions to perform communication functions well even when it is fitted into a confined space in the PC.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An orientation-adjusting device for adjusting an orientation of a wireless communication device, said wireless communication device being mounted in a main frame via an interface device, and said orientation-adjusting device comprising:
   a first housing for accommodating therein said wireless communication device;
   a second housing pivotally connected to said first housing to allow said first housing to rotate in a first direction relative thereto and including a passage for penetrating therethrough a signal cable connecting said wireless communication device and said interface device; and
   a third housing for accommodating therein said interface device, pivotally connected to said second housing to allow said second housing to rotate in a second direction relative thereto.

2. The orientation-adjusting device according to claim 1 wherein said first housing includes a first cylindrical portion for sleeving therearound said second housing, and serving as a first shaft for rotating said first housing therewith in said first direction.

3. The orientation-adjusting device according to claim 2 wherein said second housing includes a first engaging part, said third housing includes a second engaging part, and said first and second engaging parts pivotally connected to each other to serve as a second shaft for rotating said second housing therewith in said second direction, and form a second hollow cylindrical portion for penetrating therethrough said signal cable.

4. The orientation-adjusting device according to claim 3 wherein said second housing includes a hollow disk body secured to said first engaging part for sleeving around said first cylindrical portion.

5. The orientation-adjusting device according to claim 3 wherein said second hollow cylindrical portion serves as a rotation-angle confiner of said first housing in said first direction.

6. The orientation-adjusting device according to claim 1 wherein said first, direction is perpendicular to said second direction.

7. The orientation-adjusting device according to claim 1 wherein said wireless communication device is a wireless transceiver.

8. The orientation-adjusting device according to claim 1 wherein said main frame is a personal computer.

9. The orientation-adjusting device according to claim 1 wherein said interface device is a Universal Serial Bus (USB) adapter.

10. An orientation-adjusting device for adjusting an orientation of a wireless communication device, said wireless communication device being mounted in a main frame via a signal cable and an interface device, and said orientation-adjusting device comprising:
    a first housing for accommodating therein said wireless communication device, which includes a first shaft;
    a second housing including a first portion penetrating therethrough said signal cable and sleeving around said first shaft, and a second portion being of a hollow cylindrical shape; and
    a third housing including a third portion for accommodating therein said interface device, and a fourth portion being of a hollow cylindrical shape, engaging with said second portion of said second housing to form a hollow cylinder for penetrating therethrough said signal cable, and serving as a second shaft;
    wherein said first and second housings optionally perform a first relative rotating motion with said first shaft, and said second and third housings optionally perform a second relative rotating motion with said second shaft to adjust said orientation of said wireless communication device.

11. The orientation-adjusting device according to claim 10 wherein said first portion of said second housing being of a disk shape.

12. The orientation-adjusting device according to claim 10 wherein said first and second relative rotating motions are in different directions.

13. The orientation-adjusting device according to claim 10 wherein said wireless communication device is a wireless transceiver.

14. The orientation-adjusting device according to claim 10 wherein said main frame is a personal computer.

15. The orientation-adjusting device according to claim 10 wherein said interface device is a Universal Serial Bus (USB) adapter.

16. An orientation-adjustable transceiver assembly, comprising: a transceiver mounted in a first housing;

a signal cable connected to said transceiver and penetrating through a second housing which pivots relative to said first housing to adjust the orientation of said transceiver in a first direction; and an interface device connected to said signal cable and mounted in a third housing which pivots relative to said second housing to adjust the orientation of said transceiver in a second direction different from said first direction.

17. The orientation-adjustable transceiver assembly according to claim 16 wherein said first housing includes a first shaft for sleeving therearound said second housing, and allowing said second housing to pivot thereabout in said first direction.

18. The orientation-adjustable transceiver assembly according to claim 16 wherein said second housing includes a first engaging part, said third housing includes a second engaging part, and said first and second engaging parts engage with each other to form a second shaft for allowing said third housing to pivot thereabout in said second direction.

19. The orientation-adjustable transceiver assembly according to claim 18 wherein said second shaft is hollow for penetrating therethrough said signal cable.

20. The orientation-adjustable transceiver assembly according to claim 16 wherein said interface device is a Universal Serial Bus (USB) adapter.

21. An orientation-adjusting device for adjusting an orientation of a wireless communication device, said wireless communication device being disposed relative to a frame via an interface device, and said orientation-adjusting device comprising:

a first housing for accommodating at least partly therein said wireless communication device;

a second housing pivotally coupled to said first housing to allow said first housing to rotate in at least a first direction relative thereto and including a passage for penetrating therethrough at least one cable connecting said wireless communication device and said interface device; and a third housing for accommodating substantially therein said interface device, pivotally connected to said second housing to allow said second housing to rotate in at least a second direction relative thereto.

* * * * *

UNITED STATES PATENT AND TRADEMARK OFFICE
CERTIFICATE OF CORRECTION

PATENT NO. : 6,807,436 B2
DATED : October 19, 2004
INVENTOR(S) : Chien-Bin Huang et al.

It is certified that error appears in the above-identified patent and that said Letters Patent is hereby corrected as shown below:

Column 4,
Lines 21-23, "The orientation-adjusting device according to claim 1 wherein said first, direction is perpendicular to said second direction." should read
-- The orientation-adjusting device according to claim 1 wherein said first direction is perpendicular to said second direction. --

Column 5,
Lines 1-2, "An orientation-adjustable transceiver assembly, comprising: a transceiver mounted in a first housing;" should read
-- An orientation-adjustable transceiver assembly, comprising:
    a transceiver mounted in a first housing; --

Signed and Sealed this

Fourth Day of January, 2005

JON W. DUDAS
*Director of the United States Patent and Trademark Office*